United States Patent [19]

Grald

[11] Patent Number: 5,115,968
[45] Date of Patent: May 26, 1992

[54] METHOD AND APPARATUS FOR CONTROLLING A HEATING/COOLING SYSTEM BASED ON A TEMPERATURE ERROR

[75] Inventor: Eric W. Grald, Maple Plain, Minn.

[73] Assignee: Honeywell Inc., Minneapolis, Minn.

[21] Appl. No.: 591,773

[22] Filed: Oct. 2, 1990

[51] Int. Cl.⁵ .............................................. G05D 15/00
[52] U.S. Cl. ................................... 236/78 D; 165/26; 364/557
[58] Field of Search ........................... 236/78 D, 46 R; 364/557, 161; 165/26

[56] References Cited

U.S. PATENT DOCUMENTS

| | | | |
|---|---|---|---|
| 4,215,408 | 7/1980 | Games et al. | 364/505 |
| 4,253,153 | 2/1981 | Bitterli et al. | 364/505 |
| 4,430,828 | 2/1984 | Oglevee et al. | 47/17 |
| 4,460,123 | 7/1984 | Beverly | 236/46 R |
| 4,509,585 | 4/1985 | Carney et al. | 236/46 R |
| 4,630,221 | 12/1986 | Heckenbach et al. | 364/505 |
| 4,671,457 | 6/1987 | Berkhof | 236/78 D |
| 4,783,659 | 11/1988 | Frick | 364/557 X |

*Primary Examiner*—William Wayner
*Attorney, Agent, or Firm*—Edward Schwarz

[57] ABSTRACT

A temperature control system has a thermostat which provides an on/off signal. The on/off signal has an on period and an off period and is indicative of a temperature error. The temperature control system is suitable for controlling temperature control equipment. The on/off signal is sensed and the temperature error is determined based on the on/off signal. The temperature control system is controlled based on the temperature error determined.

17 Claims, 9 Drawing Sheets

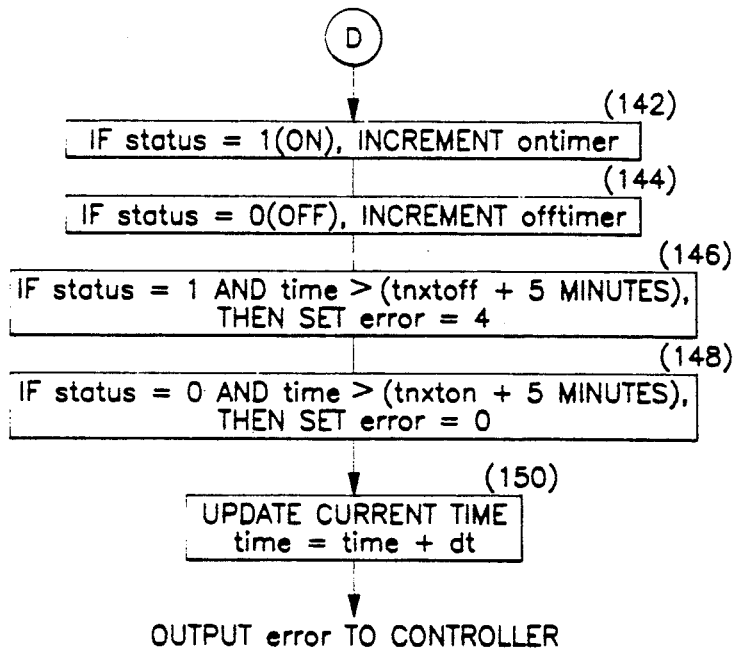

Fig. 7C

```
delta         = CONSTANT SWITCHING DIFFERENTIAL
delta_s       = DIFFERENCE BETWEEN Tmake AND Tbreak
droop         = PROPORTIONAL CONTROL BAND (theta - delta)
dt            = SAMPLE TIME
duty_cycle    = THERMOSTAT DUTY-CYCLE (ON-TIME DIVIDED BY SUM OF
error         = ERROR SIGNAL                ON- PLUS OFF- TIMES)
offtimer      = TIMER FOR THERMOSTAT OFF-PERIOD
ontimer       = TIMER FOR THERMOSTAT ON-PERIOD
status        = CURRENT THERMOSTAT ON/OFF STATUS
Tant, Tant    = SIMULATED ANTICIPATOR TEMPERATURE, TIME CONSTANT
Tbreak,Tmake  = ANTICIPATOR TEMPERATURE WHEN THERMOSTAT BREAKS, MAKES
theta         = HEAT OF SIMULATED ANTICIPATOR
theta_old     = PREVIOUS VALUE OF SIMULATED ANTICIPATION HEAT
time          = CURRENT TIME
tlastoff      = LENGTH OF LAST THERMOSTAT OFF-PERIOD
tlaston       = LENGTH OF LAST THERMOSTAT ON-PERIOD
tnxtoff       = EXPECTED TIME OF NEXT THERMOSTAT BREAK
tnxton        = EXPECTED TIME OF NEXT THERMOSTAT MAKE
```

METHOD AND APPARATUS FOR CONTROLLING A HEATING/COOLING SYSTEM BASED ON A TEMPERATURE ERROR

BACKGROUND OF THE INVENTION

The present invention deals with a temperature control system for controlling equipment used to condition a building environment. More particularly, the present invention is a technique for controlling heating/cooling equipment based on a temperature error determined from a thermostat on/off signal.

Residential heating and cooling systems typically include a thermostat which is used to sense the temperature in a conditioned environment. The thermostat typically has a temperature set point input which allows an operator to specify a desired temperature. Based on the difference between the desired temperature, set by the operator, and the temperature sensed by the thermostat, the thermostat provides a control signal to heating/cooling equipment (a heating/cooling plant). The heating/cooling plant, in turn, operates to control the temperature in the conditioned environment based on direct control signal provided by the thermostat.

Residential heating and cooling plants are often controlled by electromechanical (E/M) thermostats. Since people in the conditioned environment not only feel air temperature but also feel heat radiated from the walls of the conditioned environment, the E/M thermostat "senses" a combination of the air and wall temperatures. This "composite sensed temperature" is compared to a desired temperature set point which is provided to the E/M thermostat. Based on the difference between the composite sensed temperature and the desired set point, the E/M thermostat provides an on/off signal to control the heating/cooling plant. E/M thermostats are cost effective and generally provide acceptable thermal comfort.

However, an E/M thermostat is a proportional controller. That is, the on/off signal generated by the E/M thermostat is proportional to the difference between the composite sensed temperature and the desired set point (i.e., it is proportional to the temperature error). Thus, an E/M thermostat requires some non-zero temperature error in order to take corrective action.

The temperature error is also called droop, and the droop increases with the thermal load of the environment being controlled. Hence, where the environment being controlled has a high thermal load, the temperature droop can be large enough to cause the controlled temperature in the conditioned environment to deviate from the desired set point by as much as 3° Fahrenheit (F). In addition, where a multi-stage heating or cooling system is controlled with an E/M thermostat, the conditioned environment can experience as much as 3° F. of droop per stage.

Another problem with E/M thermostats is that they typically use anticipator heaters, the current setting of which is typically set by moving a lever. Nominal cycling performance is only provided when the anticipator heater current setting matches the actual electric current flowing through the thermostat. If the anticipator setting and the current are "mismatched", undesirable on off cycling performance will result. Even a small difference between actual current and anticipator setting can cause a large change in thermostat on off cycling rate. Fixed-value resistor anticipators typically found in thermostats used to control residential cooling plants produce different cycling rates based on the voltage applied to the thermostat. Since voltages in different systems may range from 20 to 30 VAC, the resulting cycling rates will vary widely. It would therefore be desirable to automatically "correct" the thermostat cycling rate so that the heating or cooling plant is always cycled at the proper rate (e.g., 6 cycles per hour (cph) for gas warm air furnaces, 3 cph for air conditioners, etc.) regardless of the installation conditions. Thermostat cycling rates are normally specified at the 50 percent load (equal on- and off-times) condition.

With the advent of electronic, microprocessor-based thermostats, more sophisticated control algorithms have been employed to control heating/cooling plants. A proportional-plus-integral (PI) algorithm can be implemented in these thermostats to effectively eliminate the temperature droop. Although electronic thermostats offer droopless control, as well as other features such as seven-day programming of temperature set points, they are significantly more expensive than conventional E/M thermostats.

Therefore, it would be desirable to obtain PI (i.e., droopless) temperature control from an E/M thermostat at little or no additional cost. This would combine the improved temperature control of the microelectronic thermostat with the low cost advantage of the E/M thermostat.

Residential heat pumps with auxiliary heaters require two-stage thermostats. Two-stage microelectronic thermostats are available that provide droopless control, but these thermostats cost more than their E/M counterparts. Cheaper multi-stage E/M thermostats have the disadvantage of excessive droop as mentioned above. Therefore, it would be advantageous to obtain droopless multi-stage control from a single-stage E/M thermostat with little or no extra cost.

The problem of the "mismatched" anticipator is solved by the microelectronic thermostat, since the desired cycling rate can be produced in software regardless of the electric current or voltage applied to the thermostat. However, one of several cycling rates can still be selected by the homeowner or installer and thus it is still possible that the chosen thermostat cycling rate is not appropriate for the particular heating or cooling plant being controlled. Thus, it is also advantageous that the particular cycle rate applied to a heating or cooling appliance be guaranteed, regardless of the cycle rate setting on a microelectronic thermostat.

Several types of advanced heating/cooling systems are equipped with microprocessor-based electronic control units. Examples of such systems include high-efficiency furnaces and heat pumps, two-speed and variable-speed heat pumps, and zoning systems. These microprocessor-based electronic control units are capable of containing and executing various software programs.

SUMMARY OF THE INVENTION

The present invention is a technique of controlling a heating/cooling system based on an on/off signal from a thermostat The on/off signal has an on-period and an off-period, the lengths of which are indicative of a temperature error (i.e., the difference between a desired set point and a temperature sensed in the occupied environment). The on/off signal is measured and the temperature error is determined based on the on/off signal. The heating/cooling equipment is controlled based on the temperature error determined (synthesized error) rather than directly by the on/off signal of the thermostat. The resulting control would enhance the operation of the wall thermostat alone by adding integral (droopless) control, guaranteed cycle rate, and/or multi-stage control, for example.

BRIEF DESCRIPTION OF THE DRAWINGS

FIG. 7C is the final portion of the flow diagram, the first and second portions of which are shown in FIGS. 7A and 7B.

DETAILED DESCRIPTION OF THE PREFERRED EMBODIMENTS

Determination of Error Signal from Electromechanical Thermostat 12

Figure 1:
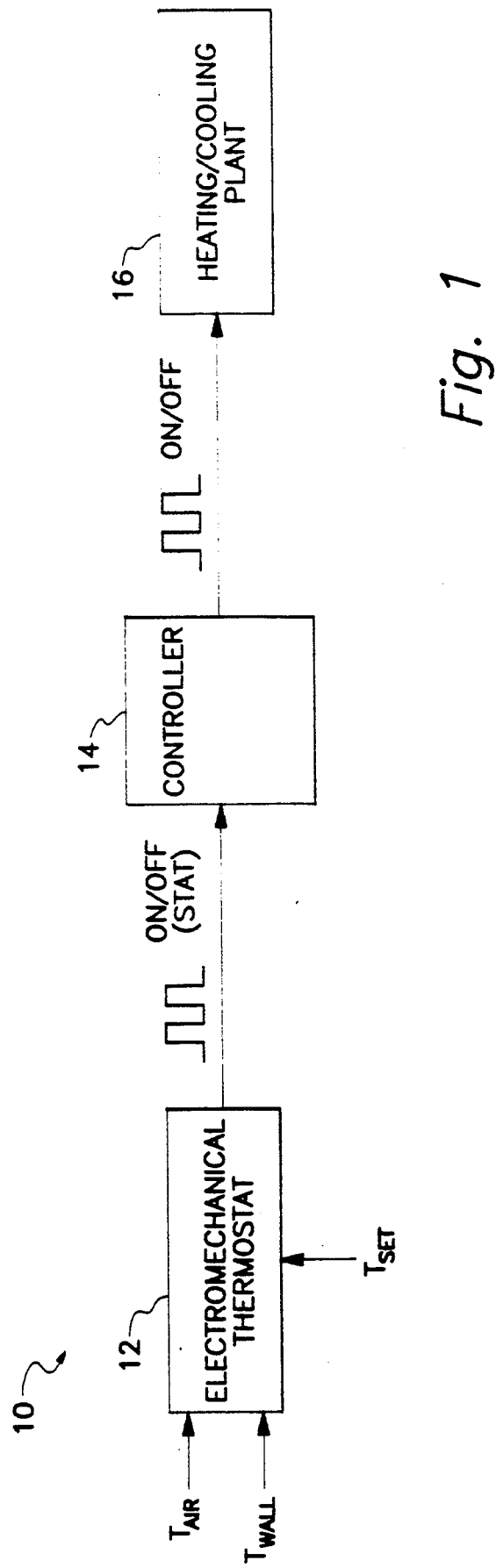
FIG. 1 is a block diagram of the temperature control system of the present invention.

FIG. 1 is a block diagram of temperature control system 10 which controls the temperature in a conditioned environment. Temperature control system 10 includes electromechanical (E/M) thermostat 12, controller 14 and heating/cooling plant 16. E/M thermostat 12, in this preferred embodiment, is a Honeywell T87 thermostat, and is typically mounted on a wall within the conditioned environment.

People located in the conditioned environment feel a temperature which is a composite temperature consisting of primarily two components. The first component is the air temperature in the conditioned environment, and the second component is the mean radiant temperature in the conditioned environment. Mean radiant temperature is defined as the uniform surface temperature of an imaginary black enclosure with which an occupant exchanges the same heat by radiation as in the actual environment. E/M thermostat 12 measures this composite temperature by sensing a combination of the air temperature ($T_{air}$) and the wall temperature ($T_{wall}$) of the conditioned environment. The sensed composite temperature is combined with a desired set point temperature ($T_{set}$) which is provided to E/M thermostat 12 as a set point input. $T_{set}$ is generally set by an operator.

E/M thermostat 12 determines a temperature error (e) which is defined as the difference between the composite sensed temperature and $T_{set}$. In response to that temperature error (e), E/M thermostat 12 generates an on/off signal (on/off(stat)). In [a] prior art implementations of a heating/cooling system, the on/off(stat) signal was typically provided directly to the heating/cooling plant 16. However, in the present invention, the on-/off(stat) signal is provided to controller 14.

Controller 14 determines the temperature error (error) based on the on/off (stat) signal provided by E/M thermostat 12 (on/off(stat)). An estimated temperature error (error) is then used to generate a synthesized on/off signal (on/off (synthesized)) which is provided to heating/cooling plant 16. In this preferred embodiment, controller 14 determines the estimated temperature error (error) and generates a synthesized on/off signal representing proportional-plus-integral (PI) control. Thus, even though E/M thermostat 12 is a proportional controller (it generates on/off(stat) which is proportional to the temperature error (e) and thus requires some non-zero error in order to take corrective action), PI control is implemented in heating system 10 through the action of controller 14. This allows control which eliminates steady-state temperature error (e) (i.e., droop) in the conditioned environment. In the preferred embodiment, the temperature in the conditioned environment is actually maintained slightly below (in the heating mode) the desired set point. This offset allows the E/M thermostat to cycle continuously even as the temperature error (e) is driven towards zero, thus providing a robust, predictable on/off signal to controller 14.

Figure 2:
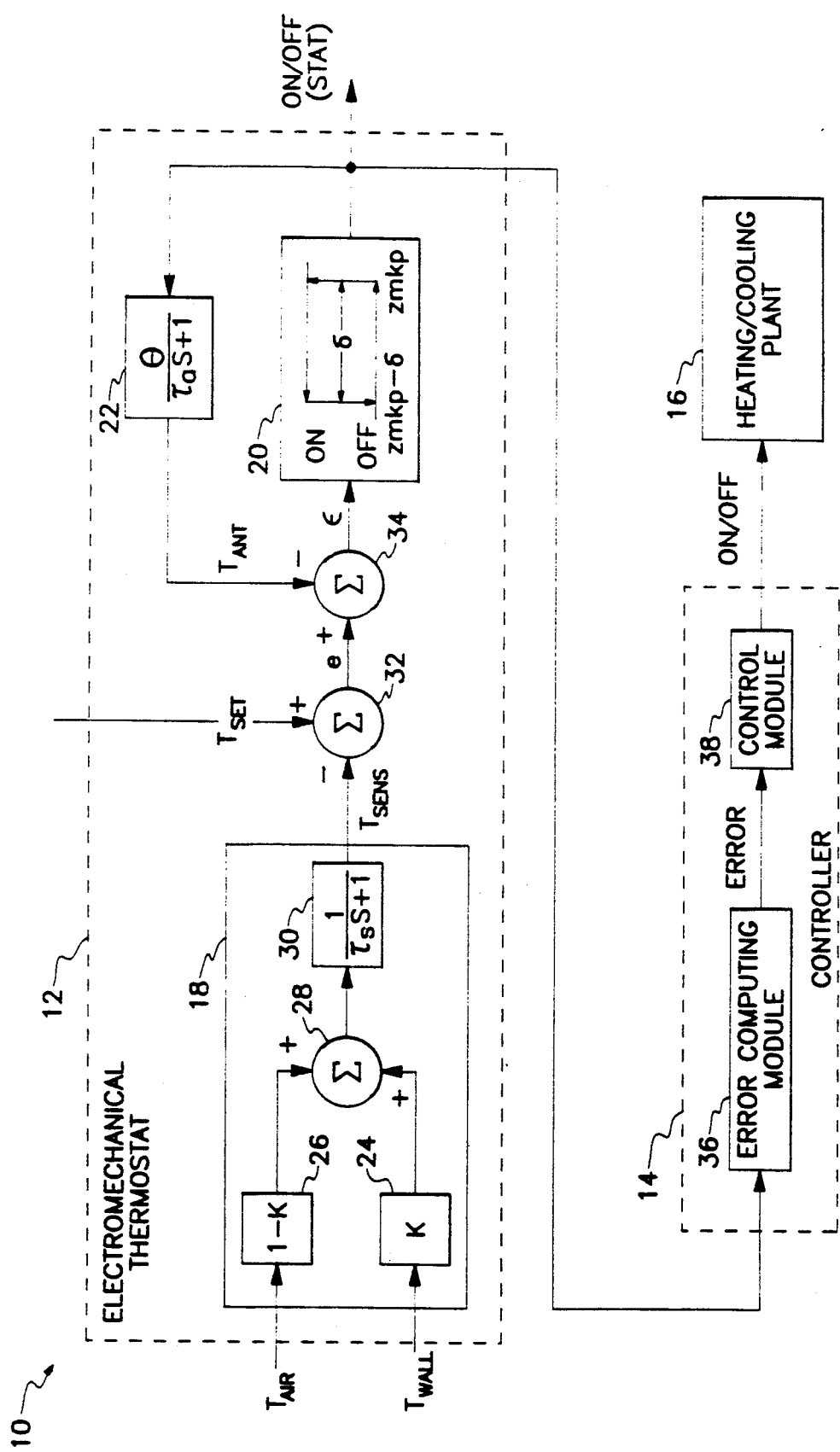
FIG. 2 is a more detailed block diagram of the temperature control system shown in FIG. 1.

FIG. 2 is a more detailed block diagram of temperature control system 10. In the following discussion, typical operation of E/M thermostat 12 in the heating mode is described. E/M thermostat 12 includes sensor 18, switch 20 and anticipator 22. In sensor 18, the wall temperature ($T_{wall}$) of the conditioned environment is multiplied by some constant K which is a fraction between 0 and 1, typically around 0.5. This is shown by block 24. Also, the air temperature ($T_{air}$) of the conditioned environment is multiplied by the quantity (1−K). This is shown in block 26. The resulting value of the temperature sensed by sensor 18 is determined according to the transfer function:

$$\frac{1}{\tau_s \cdot S + 1} \qquad \text{(Fcn. 1)}$$

where $\tau_s$ is the time constant of sensor 18; and

S is a derivative operator.

This is shown in blocks 28 and 30. In this preferred embodiment, sensor 18 operates as roughly a 20-minute filter to avoid unnecessary, high frequency cycling of heating/cooling plant 16.

The composite temperature measured by sensor 18 ($T_{sens}$) is combined with the desired set point temperature ($T_{set}$) in block 32 to produce a temperature error (e). The temperature error (e) is thus defined as:

$$e = T_{set} - T_{sens} \qquad \text{Eq. 1}$$

Figure 3A:
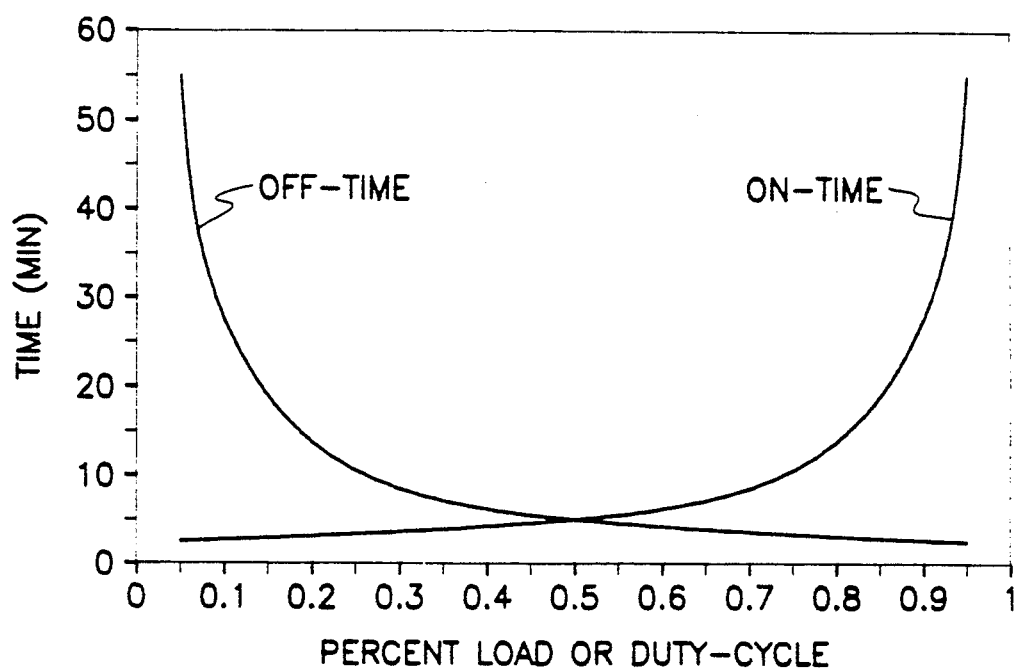
FIG. 3A is a graph showing the on- and off-times of a typical thermostat plotted against percent on-time or load.
Figure 3B:
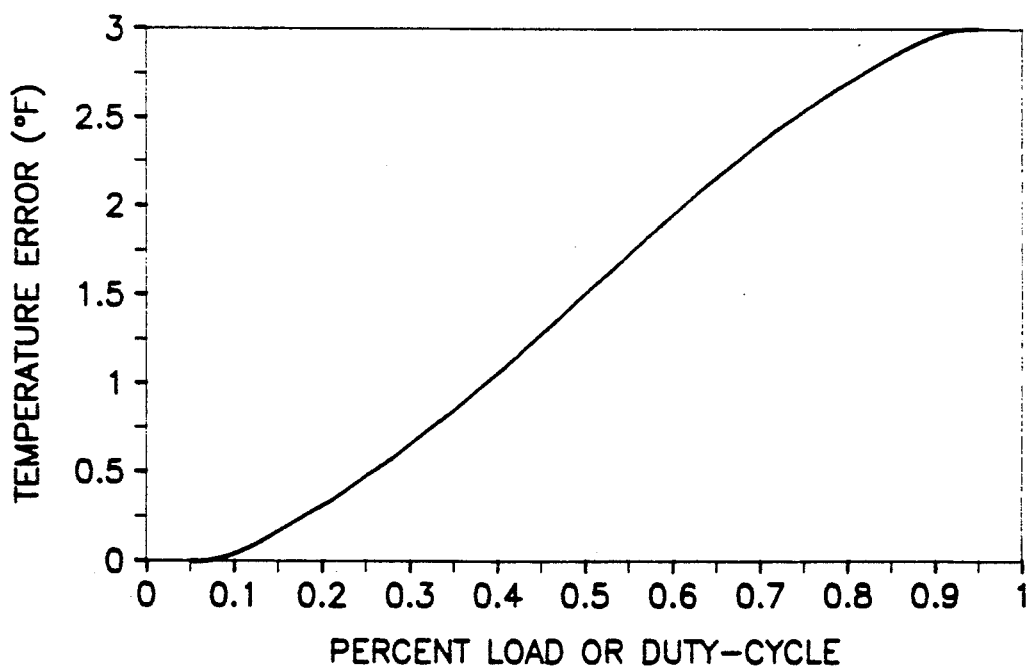
FIG. 3B is a graph showing the variation of the temperature error of a typical thermostat plotted against percent on-time or load.

As mentioned above, E/M thermostat 12 is a proportional controller—that is, some non-zero temperature error (e) is required to cause the thermostat to take corrective action. As the temperature error (e) increases from 0, the E/M thermostat 12 begins to cycle on an doff (on/off (stat) begins to switch). The on-time is short for a small temperature error (e) and increases slowly as the temperature error increases. The off-time is quite long for a small temperature error (e) and decreases rapidly as the temperature error (e) (or percent load)increases. This behavior is illustrated in FIG. 3A for a typical E/M thermostat. FIG. 3A shows that at 50 percent load, the on-time equals the off-time. For a larger load (corresponding to a greater temperature error (e)), the on time increases rapidly and the off-time asymptotically approaches its minimum value. The relationship between the temperature error (e) and load fraction (scaled from 0 to 1) is shown in FIG. 3B for this E/M thermostat 12. Note that load fraction is also called duty-cycle, where:

$$\text{duty-cycle} = \frac{\text{on-time}}{\text{on-time} + \text{off-time}} \qquad \text{Eq. 2}$$

The temperature error (e) is also referred to as droop, since it is the amount by which the sensed temperature ($T_{sens}$)deviates from the set point ($T_{set}$).

For the particular E/M thermostat 12 whose performance is shown in FIGS. 3A and 3B, the relationship between duty-cycle and temperature error (e) is almost linear. Therefore, with only a small amount of approximation:

$$\text{error} = \text{droop} \times \text{duty-cycle} \qquad \text{Eq. 3}$$

where error is the estimated or calculated temperature error; and droop is the total droop of the thermostat (i.e., the droop at 100 percent load).

Another thermostat, with different droop and cycling characteristics, will have a different relationship between temperature error (e) and duty-cycle which may not be approximated so well by a straight line. However, it has been found that the linear approximation described provides very satisfactory control for a wide range of thermostat characteristics.

It is easy to measure the on- and off-times of the thermostat signal (on/off (stat)) so that the duty-cycle may be calculated. In order to evaluate Equation 3, however, the total droop of the thermostat must be known. The total droop is given by:

$$\text{droop} = \theta - \beta \qquad \text{Eq. 4}$$

where $\theta$ is the heat of anticipation for anticipator 22 (nominally 4.5° F.); and $\delta$ is the switching differential for switch 20 (nominally 1.5° F.).

The description of temperature control system 10 now continues with reference to FIG. 2. The on/off(-stat) signal is provided to controller 14. Controller 14 includes, in this preferred embodiment, a microprocessor having two programming modules. The first programming module is error computing module 36 and the second module is control module 38. Controller 14 senses on/off(stat), and error computing module 36 computes the estimated or calculated temperature error (error) based on the on/off(stat) signal. The estimated temperature error (error) is then provided to control module 38. In this preferred embodiment, control module 38 includes any generally known proportional-plus-integral algorithm. Based on the estimated temperature error (error), control module 38 provides a synthesized on/off signal which yields proportional-plus-integral (PI) control of heating/cooling plant 16.

Error computing module 36 computes the estimated temperature error (error) from on/off(stat) using Equations 2, 3 and 4. If a slight offset (for example, 0.5° F.) is introduced at error computing module 36 under substantially steady load conditions (i.e., so that controller 14 controls the conditioned environment at a temperature of 69.5° F. when a set point of 70° F. is input to E/M thermostat 12), E/M thermostat 12 can be made to cycle continuously at a constant duty-cycle regardless of thermal load. Therefore, by integrating the length of the previous on-period and off-period of switch 20 (i.e., of on/off (stat)), the starting time of the next on-period or off-period can be reliably calculated. Also, in this way, large changes in thermal load that occur in a relatively short period of time and which are manifested in significantly longer (or shorter) than expected on- or off-periods can be detected.

The (estimated) temperature error signal is passed from error computing module 36 to control module 38 in controller 14. Using the estimated temperature error (error), control module 38 applies a PI control algorithm to generate on/off signals to control heating-/cooling plant 16. Thus, PI control of heating/cooling plant 16 is accomplished by determining the estimated temperature error (error) from the on/off signal of E/M thermostat 12 (on/off(stat)) and by using that estimated temperature error (error) to perform PI control. The temperature in the conditioned space is controlled in a droopless fashion, slightly offset from the desired set point. The small offset is constant regardless of thermal load.

It is also anticipated that control module 38 can apply a proportional-only type control algorithm to control heating/cooling plant 16. This is done, for example, when plant 16 is a single-stage heating/cooling plant and when it is desired to ensure that a particular cycling rate be used. Another application is where knowledge of the temperature error (e) is required for zoned heating/cooling control. In this case, the temperature offset in error computing module 36 mentioned above is unnecessary. The resulting temperature control in the conditioned environment or zone will have a nominal amount of droop (0° to 3° F.), depending on the load.

DETERMINING THE HEAT OF ANTICIPATION

In the discussion of thermostat performance above, it has been assumed that the values of the various thermostat parameters (e.g., the heat of anticipation, $\theta$, and the switching differential, $\delta$) are known. Therefore, their nominal values were included in the error signal estimation processes. However, these thermostat parameters, especially the heat of anticipation, $\theta$, and to a lesser extent the anticipator time constant, $\tau_a$, can in fact vary significantly from their nominal values due to a variety of reasons. The anticipator time constant, $\tau_a$, defines the rate at which the anticipator temperature rises and falls, according to a first-order exponential response.

For example, the heat of anticipation in an E/M thermostat is adjusted by using a well-known technique of moving a lever, or wiper on the thermostat. Upon installation, the wiper should be positioned according to a scale to match the amount of electric current drawn by the anticipator when a corresponding thermostat switch, such as switch 20 in this preferred embodiment, is turned on. If the wiper position does not correctly correspond to the electric current drawn, the resulting cycle rate, and thus the comfort provided by the thermostat control, can vary significantly from the desired nominal operation.

One example of how such an erroneous setting can affect heating/cooling system 10 is as follows. If the wiper corresponding to anticipator 22 is set assuming anticipator 22 draws 0.4 amps of electric current when switch 20 closes, or makes, and if the actual electric current drawn by anticipator 22 is 0.4 amps, then E/M thermostat 12 operates properly, yielding 6 cycles per hour (cph). However, if the anticipator wiper is set to correspond to 0.4 amps, and the actual electric current drawn is 0.3 amps, E/M thermostat 12 only yields a cycling rate of 3 cph. The conditioned environment could experience large air temperature swings due the slow cycling rate, causing occupant discomfort.

On the other hand, if the actual current drawn by the anticipator is 0.5 amps, the resulting cycle rate would be almost 10 cycles an hour. This excessive cycling rate would subject the equipment in heating/cooling plant 16 to needless wear and tear.

Other factors which can affect the values of the heat of anticipation, $\theta$, and the anticipator time constant, $\tau_a$, are variations due to manufacturing processes and incorrect settings for the cycle rate of a microelectronic thermostat. Because of these variations in $\theta$ and $\tau_a$, it is desirable that the technique employed by computing module 36 in temperature control system 10 (and by computing module 48 in temperature control system 40, yet to be discussed) use a temperature error estimation technique that is insensitive to variations in the thermostat parameters.

In the example discussed above, where the anticipator wiper was set so that it did not correspond to the actual current drawn by the anticipator, the factor which caused the bulk of the cycling irregularities was the heat of anticipation, $\theta$. If the anticipator wiper is improperly set, $\theta$ can vary by a factor of ten (for example, from 2° F. all the way to 20° F.) or more. Although the anticipator time constant, $\tau_a$, is changed if the anticipator wiper position is changed, $\tau_a$ is fairly constant over the range of most anticipator settings on typical electromechanical thermostats. $\tau_a$ might vary by a factor of two at most. Also, the switching differential, $\delta$, is a constant that is known within the tolerances of the manufacturing process (typically ±15%). Thus, by properly adjusting the value of $\theta$ used in controller 14, variations in $\tau_a$ and $\delta$ can be accounted for (e.g., a smaller $\tau_a$ makes the "effective" $\theta$ appear larger).

Therefore, the heat of anticipation, $\theta$, is the only thermostat parameter that changes significantly, depending on the current draw of the anticipator and the setting of the anticipator wiper. Thus, the heat of anticipation, $\theta$, ultimately dictates the cycle rate and temperature droop of the thermostat, and it is desirable to know the actual value of $\theta$ so that the estimated temperature error (error) can be determined with reasonable accuracy.

In this preferred embodiment, error computing module 36 derives an estimate of the heat of anticipation, $\theta$, of the thermostat cycling in the conditioned environment. It does this by simulating, in a stored software program, the variation of the anticipator temperature over time. Before disclosing the method by which the heat of anticipation is estimated, it is useful to complete the discussion of the operation of E/M thermostat 12, now focusing on anticipator 22 and differential switch 20 shown in FIG. 2.

Based on the on/off signal of E/M thermostat 12 in FIG. 2, current is applied to anticipator 22. Anticipator 22 is typically the thermostats bimetal coil and a resistance winding which together produce heat as electric current is conducted through them. The heat produced by anticipator 22 gives rise to an anticipator temperature ($T_{ant}$), which is measured above the ambient temperature. The anticipator temperature thus varies between 0 and $\theta$ according to the transfer function:

$$\frac{\theta}{\tau_a \cdot S + 1} \quad \text{(Fcn. 2)}$$

where
$\theta$ equals the heat of anticipation for anticipator 22 (nominally about 4.5° F.);
$\tau_a$ is the anticipator time constant; and
S is the derivative operator.

The temperature error (e) is combined with $T_{ant}$ in block 34 to produce an adjusted error ($\epsilon$) which is provided to switch 20. Thus, $$\epsilon = e - T_{ant} \quad \text{Eq. 5}$$

When $\epsilon$, which has units of degrees Fahrenheit, in this preferred embodiment, reaches a certain level, switch 20 turns on. This level is known as the make point (zmkp) of thermostat 12 (i.e., $\epsilon$=zmkp). When switch 20 makes, or turns on, current begins to flow through anticipator 22. Thus, $T_{ant}$ begins to rise and the value $\epsilon$ begins to fall. When $\epsilon$ reaches a value of the switch make point (zmkp) minus a switching differential for switch 20 ($\delta$) (i.e., when $\epsilon$=zmkp−$\delta$) then switch 20 breaks, or turns off. Current ceases to flow through anticipator 22 and its temperature $T_{ant}$ begins to decrease.

Figure 4A:
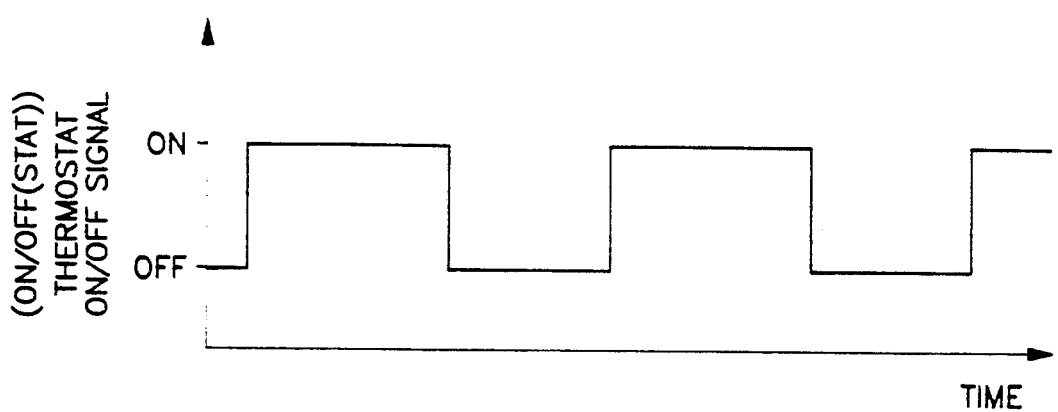
FIG. 4A is a graph showing an on/off signal from a thermostat plotted against time.
Figure 4B:
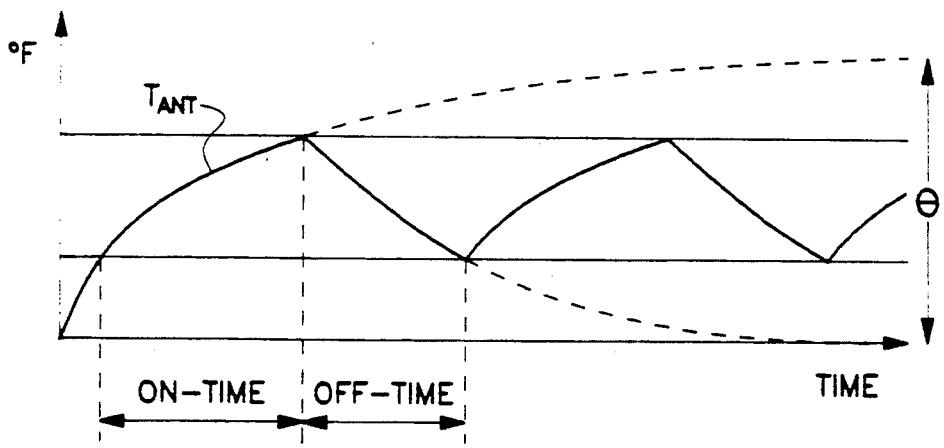
FIG. 4B is a graph showing anticipator temperature $T_{ant}$ (in °F.) plotted against time and corresponding to the on/off signal shown in FIG. 4A.
Figure 4C:
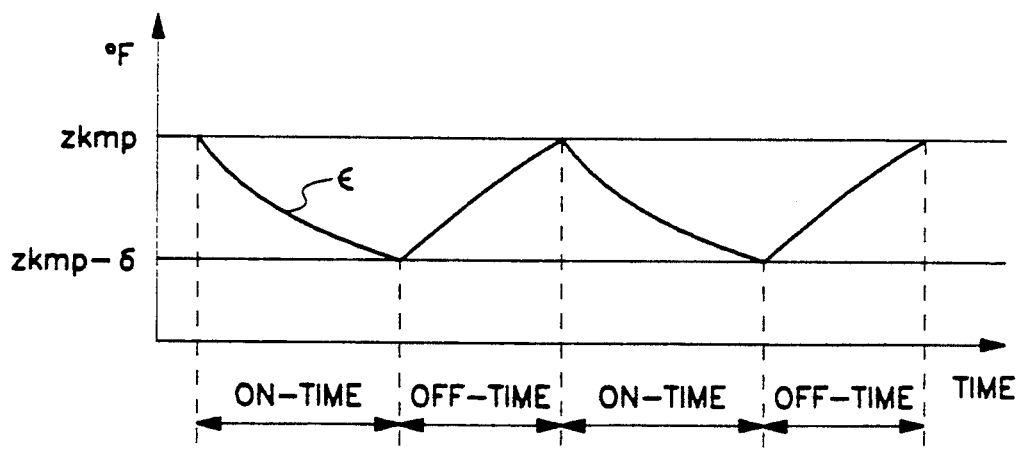
FIG. 4C is a graph showing an adjusted error signal, $\epsilon$, plotted against time and corresponding to the on/off signal shown in FIG. 4A.

The operation of switch 20 and anticipator 22, as it relates to $\epsilon$ and $T_{ant}$, is more clearly illustrated in FIGS. 4A, 4B and 4C. FIG. 4A shows the on/off signal of E/M thermostat 12 (on/off (stat)) plotted against time. FIG. 4B shows temperature $T_{ant}$, in degrees Fahrenheit, plotted against time. FIG. 4C plots the value $\epsilon$, also in degrees Fahrenheit, against time. The on-periods and off-periods of the thermostat on/off signal, shown in FIG. 4A, correspond to FIGS. 4B and 4C.

The method by which the heat of anticipation is estimated is now described. In general, the method includes the simulation or calculation of the anticipator temperature as a function of time by computing module 36 using assumed values of $\theta$, $\tau_a$ and $\delta$. Simulated values have an "s" subscript in the equations below to distinguish them from the actual values in E/M thermostat 12.

The heat of anticipation in thermostat 12 can be expressed as:

$$\theta = \delta \left[ \frac{1}{e^{t_{off}/\tau_a} - 1} - \frac{1}{e^{-t_{on}/\tau_a} - 1} \right] \quad \text{(Eq. 6)}$$

where
$\delta$ is the nominal switching differential of the switch 20 in the thermostat 12;
$t_{off}$ is the length of the off-period of on/off(stat);
$t_{on}$ is the length of the on-period of on/off(stat); and
e is the exponential operator.

Given Fcn. 2, which is a transfer function representing the variation in time of the anticipator temperature, and the on/off state of thermostat 12 known at each point in time, a difference equation can be derived by which the anticipator temperature, $T_{ant}$, can be calculated as a function of time:

if thermostat 12 is on:

$$T_{ant,s} = T_{ant,s,prev} + \frac{dt}{\tau_{a,s}} (\theta_s - T_{ant,s,prev}) \qquad \text{(Eq. 7)}$$

if thermostat 12 if off:

$$T_{ant,s} = T_{ant,s,prev} + \frac{dt}{\tau_{a,s}} (-T_{ant,s,prev})$$

where $T_{ant,s}$ is the simulated anticipator temperature;
$T_{ant,s,prev}$ is the simulated anticipator temperature from the previous sample time step;
dt is the sample time step;
$\tau_{a,s}$ is the simulated anticipator time constant; and
$\theta_s$ is the simulated heat of anticipation.

Similarly, the simulated value for the heat of anticipation ($\theta_s$) can be expressed as:

$$\theta_s = \delta_s \left[ \frac{1}{e^{t_{off}/\tau_{a,s}} - 1} - \frac{1}{e^{-t_{on}/\tau_{a,s}} - 1} \right] \qquad \text{(Eq. 8)}$$

where $\beta_s$ is the difference between the simulated anticipator temperature when the switch makes, and the simulated anticipator temperature when the switch breaks ($T_{make,s} - T_{break,s}$).

Assuming that the value of $\tau_{a,s}$ implemented in error computing module 36 is close to the actual value of $\tau_a$ in thermostat 12. Equation 8 may be subtracted from Equation 6 to yield $$\theta - \theta_s = (\delta - \delta_s) \left[ \frac{1}{e^{t_{off}/\tau_{a,s}} - 1} - \frac{1}{e^{-t_{on}/\tau_{a,s}} - 1} \right] \qquad \text{(Eq. 9)}$$

Thus, Equation 9 is an expression for the difference between the actual value of the heat of anticipation in thermostat 12 and the value used in computing module 36 to simulate $T_{ant}$, given known or assumed values of the simulated heat of anticipation, actual switching differential, anticipator time constant and thermostat on- and off-times. It is desired that the estimate of the heat of anticipation be updated whenever new information is available to computing module 36 (i.e., whenever a new on- or off-time of on/off(stat) is computed). The right hand side of Equation 9 is therefore the amount by which the simulated heat of anticipation should be changed so that it matches the actual heat of anticipation. Therefore, it can be written:

$$\theta_s = \theta_{s,prev} + (\delta - \delta_s) \left[ \frac{1}{e^{t_{off}/\tau_{a,s}} - 1} - \frac{1}{e^{-t_{on}/\tau_{a,s}} - 1} \right] \qquad \text{(Eq. 10)}$$

where $\theta_{s,prev}$ is the previous value of the simulated heat of anticipation.

For typical values of $t_{off}$, $t_{on}$ and $\tau_{a,s}$, the bracketed term $$\left[ \frac{1}{e^{t_{off}/\tau_{a,s}} - 1} - \frac{1}{e^{-t_{on}/\tau_{a,s}} - 1} \right]$$

will range between approximately 2 and 5. Therefore, the sign of the term $(\delta - \delta_s)$ always is correct (i.e., positive or negative) regardless of the value of the bracketed term. By replacing the bracketed term in Equation 10 with a constant equal to 1, successive calculations always result in the value of the simulated heat of anticipation converging to the actual value of $\theta$. The simplified equation (with the bracketed term set equal to 1) is significantly easier to implement in a stored program executed by a microprocessor, since no division or exponential operations are required. Therefore, in this preferred embodiment, the updated equation for $\theta_s$ is as follows:

$$\theta_s \approx \theta_{s,prev} + (\delta - \delta_s) \qquad \text{Eq. 11}$$

where $\delta$ is a value chosen to be close to the expected nominal switching differential of the switch in thermostat 12.

At the beginning of each thermostat on-period, the value of $\theta_s$ is updated before calculating the total droop according to Equation 4 in error computing module 36. By determining the simulated heat of anticipation, $\theta_s$, in this way, the estimated temperature error (error) is insensitive to variations in thermostat parameters. It should be noted that this technique requires only the on/off(stat) signal from the thermostat 12 and, thus, is compatible with the techniques described earlier to determine the estimated temperature error (error) in controller 14. Hence, this calculation can be carried out in controller 14, for example, in error computing module 36, with little additional cost.

DETERMINATION OF ERROR FROM MICROELECTRONIC THERMOSTAT 42

Figure 5:
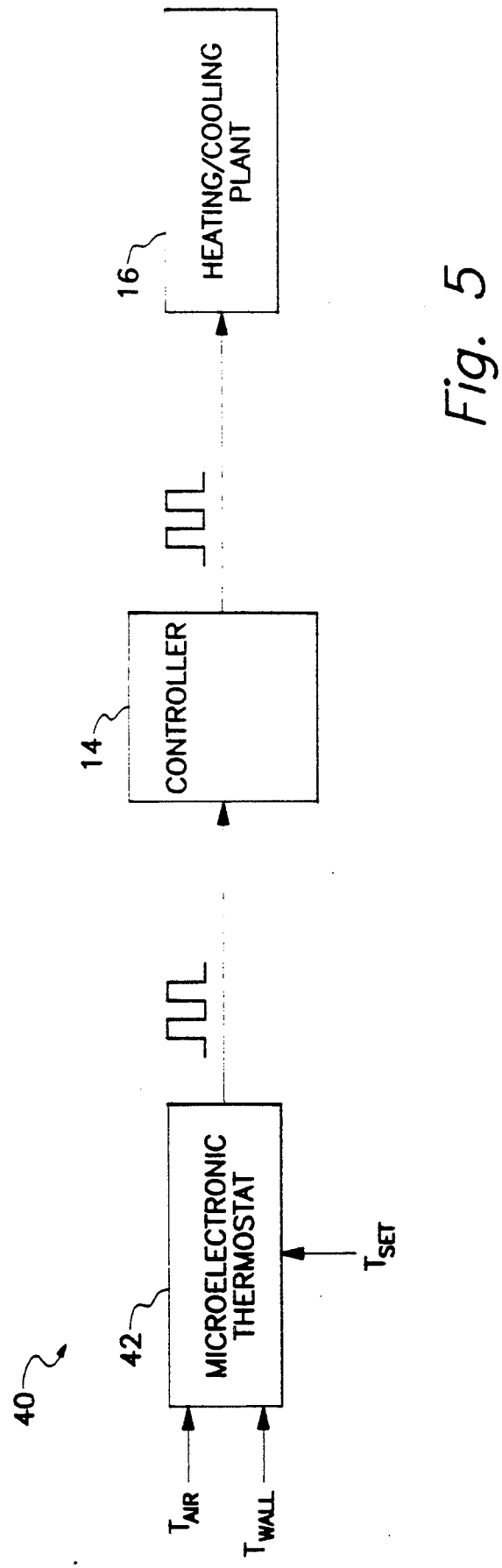
FIG. 5 is a temperature control system utilizing a microelectronic thermostat.

It may also be desirable, in order to avoid certain cycling rate problems or to implement an advanced zoning control strategy, to determine or estimate the temperature error (e) in a temperature control system which utilizes a microelectronic thermostat. FIG. 5 is a block diagram of such a temperature control system. Temperature control system 40 is very similar to temperature control system 10 and similar components are correspondingly numbered. The difference between temperature control system 10 and temperature control system 40 is that the latter includes microelectronic thermostat 42 which, in this preferred embodiment, is a Honeywell T8600 thermostat used to perform PI control of heating/cooling plant 16. Also, a new error computing module (shown in FIG. 6) is included in controller 14.

Figure 6:
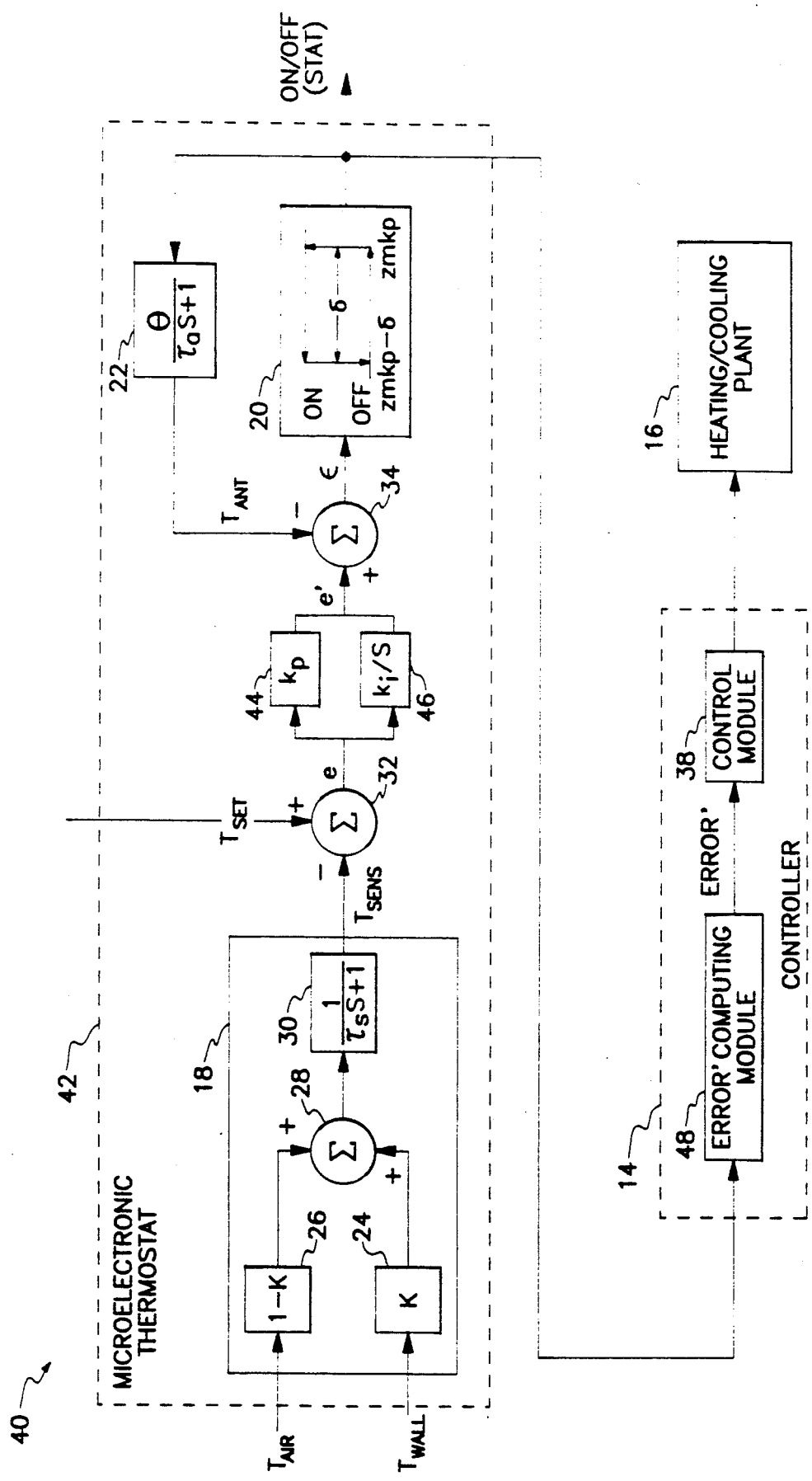
FIG. 6 is a more detailed block diagram of the temperature control system shown in FIG. 5.

FIG. 6 is a more detailed block diagram of temperature control system 40. In this preferred embodiment, a microprocessor operating according to a stored program is used to accomplish functions and calculations shown by the block diagram in FIG. 6. In microelectronic thermostat 42, sensor 18 functions the same as sensor 18 shown in E/M thermostat 12. In addition, the temperature error (e) is determined the same way.

However, in microelectronic thermostat 42, a composite temperature error (e') is also determined. Composite temperature error (e') is composed of a proportional component and an integral component. This is represented by blocks 44 and 46. Once composite temperature error (e') is determined. block 34, switch 20 and anticipator 22 operate in a manner similar to that discussed with reference to E/M thermostat 12. Therefore, for microelectronic thermostat 42, $$e' = e - T_{ant}.$$

A comparison of FIGS. 2 and 6 reveals that the composite error (e') in the microelectronic thermostat 42 is analogous to the temperature error (e) in the E/M thermostat 12. Therefore, if Equation 3 is implemented in error computing module 48, using the total droop $(\theta - \delta)$ and duty-cycle of a microelectronic thermostat 42, the result is an estimated composite temperature error (error') estimate of the composite temperature error (e'). This, estimated composite temperature error error') can be subsequently used to generate an on/off control signal for a heating/cooling plant. In this preferred embodiment, control module 38 in controller 14 generates an on/off signal using a proportional-only (P-only) control algorithm. The resulting temperature control in the conditioned environment is droopless, however, since the estimated composite temperature error (error') signal derived from the microelectronic thermostat 42 already contains the integrated error.

In other applications. however, one would like to approximate the temperature error (e) from a microelectronic thermostat. One example is where different proportional and integral control gains are applied to the temperature error such that a multi-stage heating or cooling system can be controlled. The estimated composite temperature error (error') must be "de-integrated" to determine the estimated temperature error (error). This procedure is described next.

Since error' is composed of a proportional and an integral portion, error, can be represented by the following equation:

$$\text{error}' = (k_p \cdot \text{error}) - k_i \cdot \text{error} \cdot dt + \text{eint} \quad \text{Eq. 13}$$

where
- $k_p$ is the proportional gain of microelectronic thermostat 42;
- $k_i$ is the integral gain;
- dt is the integration time step size; and
- eint is the integrated error from the previous sample time dt.

Solving Equation 13 for the temperature error (e), yields:

$$\text{error} = \frac{\text{error}' - \text{eint}_{old}}{k_p + k_i \cdot dt} \quad \text{(Eq. 14)}$$

Now, eint can be updated as follows:

$$\text{eint}_{new} = \text{eint} + k_i \cdot \text{error} \cdot dt \quad \text{(Eq. 15)}$$

where $\text{eint}_{old,prev}$ is the value of $\text{eint}_{old}$ from the previous time step.

These calculations are performed by error computing module 48 in controller 14. Error computing module 48 then provides the estimated temperature error, (error), to control module 38 which, in this preferred embodiment, contains a multi-stage PI thermostat algorithm implemented in software. Thus, by using only the signal on/off(stat) from a single-stage microelectronic thermostat 42, controller 14 provides droopless multi-stage control of heating/cooling plant 16.

Determination of Error Using Time Varying $\epsilon$

In an alternative embodiment, rather than using the duty-cycle of the thermostat 42 to determine temperature error (e), a relationship between the temperature error (e), the simulated anticipator temperature and the variation of $\epsilon$ over time is used. FIG. 4B shows that once switch 20 turns on, current begins to flow through anticipator 22 and the anticipator temperature, $T_{ant}$, begins to rise along a first order exponential curve. When switch 20 turns off, current stops flowing through anticipator 22 and anticipator 22 begins to cool. Thus, $T_{ant}$ falls generally along a first order exponential curve. This pattern continues throughout the operation of E/M thermostat 12.

Since the anticipator temperature and the adjusted error, $\epsilon$, are related to the temperature error by Equation 5, then, if the temperature error e is to be kept constant, as $T_{ant}$ rises along an exponential curve, the adjusted error, $\epsilon$, must fall. FIG. 4C shows that, when switch 20 makes, $\epsilon$ is at a value zmkp (the make point for switch 20). As $T_{ant}$ rises, $\epsilon$ falls until it hits a value of zmkp $- \delta$. At that point, switch 20 breaks, or turns off. When switch 20 is turned off, and as $T_{ant}$ falls, the value of $\epsilon$ rises. When $\epsilon$ reaches the make point (zmkp), switch 20 again makes, or turns on. and the value of $\epsilon$ begins to fall. Like the response of $T_{ant}$, the response of $\epsilon$ continues throughout the operation of E/M thermostat 12.

If only the state of switch 20 is known (i.e. if all that is known about switch 20 is whether it is on or off) then the value of $\epsilon$ is known at two points during the operation cycle of E/M thermostat 12. That is, when the thermostat is on, or makes, then:

$$\epsilon = \text{zmkp} \quad \text{(Eq. 16)}$$

and when switch 20 is off, or breaks, then:

$$\epsilon = \text{zmkp} - \delta \quad \text{(Eq. 17)}$$

Therefore, if the values of zmkp and $\delta$ are known for a particular thermostat, then $\epsilon$ can be evaluated at the make point and break point of switch 20 by use of Equations 15 and 16. Furthermore, if the heat of anticipation, $\theta$, and the anticipator time constant, $\tau_1$, are known for the same particular thermostat, then the anticipator temperature $T_{ant}$ can be evaluated at any point in time through the use of transfer function 2 shown above. Now since both $\epsilon$ and $T_{ant}$ are known at the make point and break point of switch 20, the value of the estimated temperature error (error), when switch 20 makes or breaks can be estimated using Equation 5.

However, to perform real time PI control, controller 14 must estimate the value of the estimated temperature error (e), as a function of time. Adjusted error $\epsilon$, follows generally a first order exponential curve between switching events. Therefore, for short on periods and off periods, the exponential curve can be very closely approximated by a straight line. Hence, in order to calculate $\epsilon$ as a function of time, the time of the next switching event (either make or break) must be known. Then, the values of $\epsilon$ equal to zmkp and zmkp $- \delta$ are connected by a straight line over that time period and $\epsilon$ is approximated as a function of time.

If a slight offset (for example, 0.5° Fahrenheit) is introduced at E/M thermostat 12 (i.e. so that E/M thermostat 12 attempts to control at 70.5° F. when a set point of 70° is input) E/M thermostat 12 can be made to cycle continuously at a constant duty cycle regardless of thermal load. Therefore, by integrating the length of the previous on period and off period of switch 20, the starting time of the next on period or off period can be reliably calculated.

Since the values for є and $T_{ant}$ are now known as a function of time, (Fcn. 2 and Eq. 5) an estimate of the temperature error (e) can be determined at each point in time using Equation 5 and the estimated temperature error (error) representing temperature error (e) is generated. The estimated temperature error (error) is passed in a signal from error computing module 36 to control module 38 in controller 14. Using the estimated temperature error (error) control module 38 performs PI control of heating/cooling plant 16. Thus, PI control of heating/cooling plant 16 is accomplished by estimating the temperature error, (e) from the on/off of E/M thermostat 12 (on/off (stat)) and by using the estimated temperature error signal (error) to perform PI control.

DESCRIPTION OF FLOWCHART DEPICTING THE PREFERRED EMBODIMENT

Figure 7A:
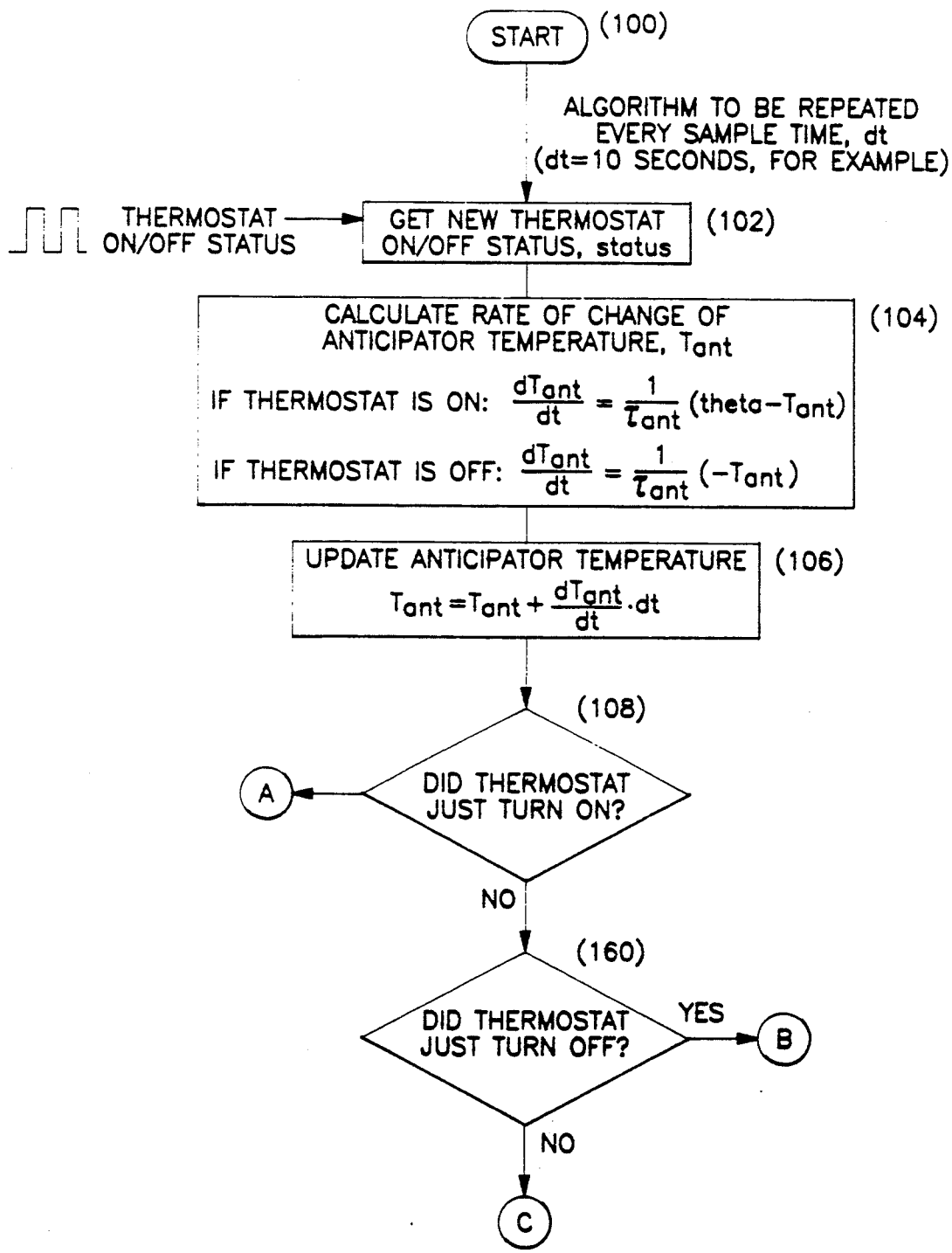
FIG. 7A is a first portion of a flow diagram showing operation of a temperature control system of the present invention.
Figure 7B:
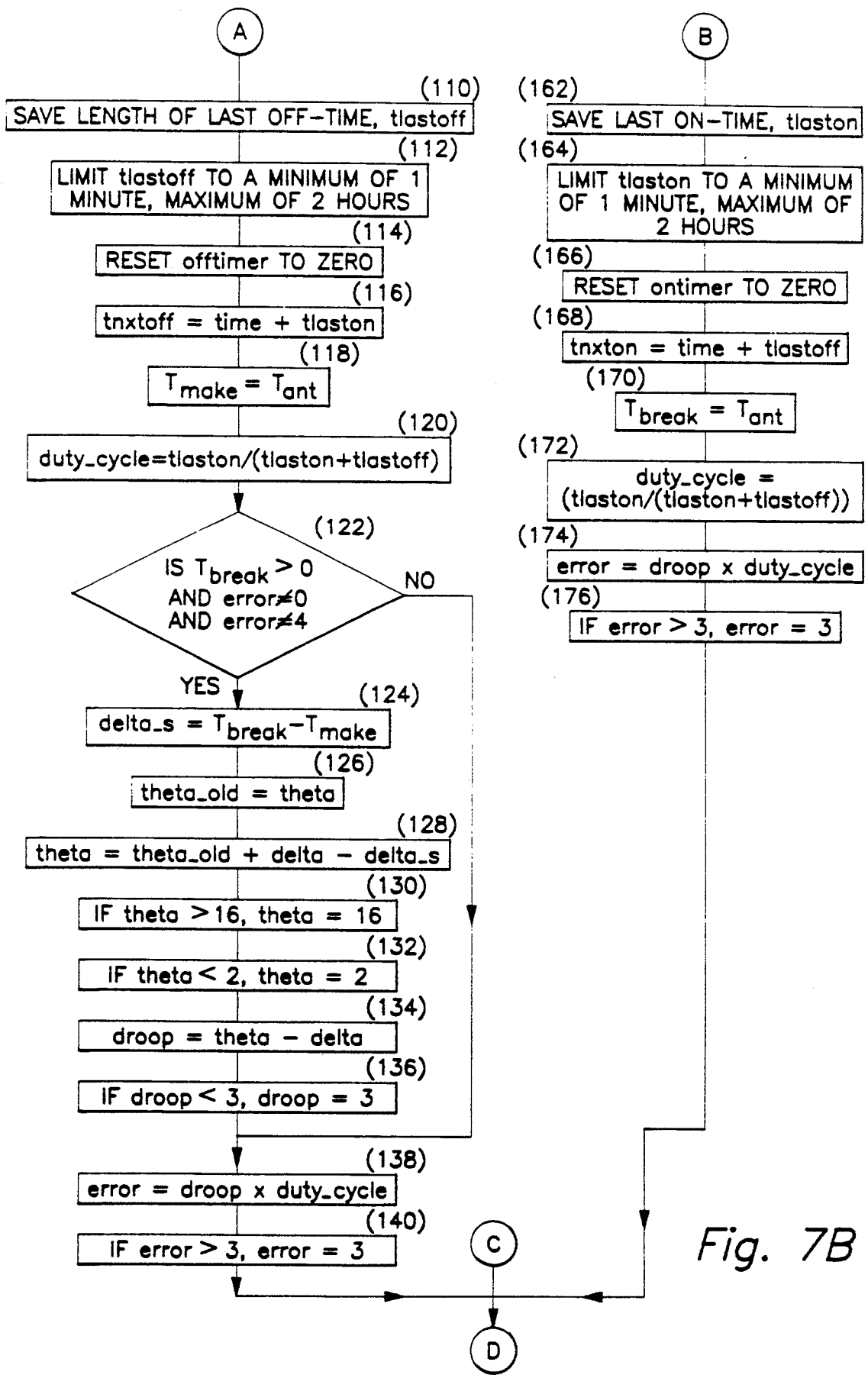
FIG. 7B is a second portion of the flow diagram, the first portion of which is shown in FIG. 7A.

FIGS. 7A, 7B and 7C show a flow diagram illustrating one preferred embodiment of the operation of controller 14 in determining the simulate heat of anticipations and the estimated temperature error (error) in response to the on/off signal from an E/M thermostat. The terms used throughout flow diagrams 7A, 7B and 7C are defined as follows:

delta = nominal switching differential ($\delta$);
delta$_s$ = difference between $T_{make}$ and $T_{break}$ ($\delta_s$);
droop = estimated total droop of thermostat ($\theta_s - \delta$);
dt = sample time;
duty-cycle = thermostat duty-cycle;
error = estimated temperature error (error);
offtimer = timer for thermostat off-period;
ontimer = timer for thermostat on-period;
status = thermostat on/off status;
$T_{ant}$ = simulated anticipator temperature;
$\tau_{ant}$ = simulated anticipator time constant;
$T_{break}$ = simulated anticipator temperature when thermostat breaks;
$T_{make}$ = simulated anticipator temperature when thermostat makes;
theta = heat of simulated anticipator ($\theta_s$);
theta$_{old}$ = previous value of simulated anticipation heat ($\theta_{s,prev}$);
time = current time;
tlastoff = length of last thermostat off-period;
tlaston = length of last thermostat on-period;
tnxtoff = expected time of next thermostat break; and
tnxton = expected time of next thermostat make.

In this preferred embodiment, error computing module 36 or 48 computes the estimated temperature error (error) once every 10 seconds. This is shown in reference to block 100. The first step is to determine whether the switch (e.g. switch 20) in the particular thermostat is on or off. Then, the value of the simulated anticipator temperature, $T_{ant}$, is determined. This requires first determining the rate of change of the simulated anticipator temperature with respect to time. That rate of change varies depending on whether the thermostat is on or off. Once the rate of change of the simulated anticipator temperature is known, the simulated anticipator temperature is updated from the simulated anticipator temperature determined during the previous sample time. These steps are shown in blocks 102, 104 and 106.

The next step is to determine whether the thermostat has just turned on (i.e., whether the on/off status of the thermostat has changed since the last sample time). That is indicated by block 108. If the thermostat has just turned on, then the length of the last off-period is saved. However, the length of the last off-period is limited to a minimum of one minute and a maximum of two hours in this preferred embodiment. Those steps are illustrated in blocks 110 and 112. Then, the timer which times the off-period is reset to zero as shown in block 114.

In order to detect large changes in heating or cooling load (e.g., a set point change), the time of the next expected thermostat off-period must be determined. That is determined by adding the length of the last on-time to the present time. That step is shown in block 116.

Next, the present temperature of the simulated anticipator is saved as $T_{make}$. The duty-cycle of the thermostat is also calculated. These steps are indicated in blocks 118 and 120.

If the simulated anticipator temperature the last time that the thermostat turned off or broke is greater than zero (i.e., if $T_{break} > 0$) and the estimated temperature error (error) is not equal to 0 and the estimated temperature error (error) is not equal to 4, then the following logic is executed. $\delta_s$ is set to $T_{break}$ minus $T_{make}$ and the previous value of the simulated heat of anticipation is set to the present value of the simulated heat of anticipation. The updated value of the simulated heat of anticipation is computed by adding the previous value of the simulated heat of anticipation to the difference between the constant switching differential expected in the thermostat and the difference between $T_{make}$ and $T_{break}$. These steps are indicated by blocks 122, 124, 126 and 128. The simulated heat of anticipation is limited to a maximum value of 16 in block 130 and a minimum value of 2 in block 132. The total droop (droop) of the thermostat is computed as S minus in block 134. The total droop (droop) is limited to a minimum of 3 in block 136.

If, either $T_{break}$ is equal to zero or the estimated temperature error (error) is equal to 0 or 4 in block 122, or after the execution of block 136, the estimated temperature error (error) is computed as the droop times the duty-cycle. The error is limited to a maximum value of 3. This is indicated in blocks 138 and 140. The appropriate on- or off-timer is incremented. If the thermostat has been on longer than expected (i.e., past the time of the next expected off-period plus 5 minutes), then the estimated temperature error (error) is set to 4. This is done to guarantee that the heating or cooling plant is turned on in a timely fashion when there is a set point change or other load disturbance. If the thermostat has been off longer than expected (i.e., past the time of the next expected on-period plus 5 minutes), then the estimated temperature error (error) is set to 0. This is done to guarantee that the heating/cooling plant is turned off in a timely fashion if the set point temperature is set back (e.g., energy savings mode). This is indicated in blocks 142, 144, 146 and 148.

Once the estimated temperature error (error) is determined, the current time is updated to include the 10 second sample time step and the error is provided to control module 38 in controller 14. Ten seconds later, the algorithm is repeated.

If, in block 108, it is determined that the thermostat did not just turn on, the next step is to determine whether it has just turned off as indicated by block 160. If it has not, error computing module 36 picks up with blocks 142 through 150. However, if the thermostat did just turn off, as determined in block 160, then the value of the last on-time is saved, but is limited to a value between one minute and two hours, and the on-timer is reset to zero. This is indicated in blocks 162, 164 and 166. Then, the time of the next on-period is estimated by adding the value of the last off-period to the present time. This is indicated by block 168.

Since the thermostat has just turned off, the temperature of the simulated anticipator is saved as $T_{break}$. The duty-cycle of the thermostat is calculated and the estimated temperature error (error) is computed as the droop times the duty-cycle. The estimated temperature error (error) is limited to a maximum value of 3. This is indicated in blocks 170, 172, 174 and 176. Next, the error estimation module proceeds to blocks 142 through 150 as described above.

CONCLUSION

The present invention allows PI, or droopless, control in a temperature control systems utilizing only an electromechanical thermostat such as E/M thermostat 12. In addition, the present invention can be implemented in many heating/cooling systems which already are equipped with microprocessor-based control units with little or no additional cost. Such heating/cooling systems include high-efficiency, single-stage heat pumps that have microprocessor-based controls for such functions as demand defrost and electronic expansion valve control. Also, the present invention can be implemented in two-speed or variable-speed heat pumps that have similar controls or that have microprocessor-based compressor and fan speed controls. The need for a multi-stage E/M thermostat would be eliminated along with the associated droop per stage.

Also, the present invention can be implemented in zoning systems such as in residential homes with more than one thermostat and which have microprocessor-based master control centers. The temperature error e in each zone can then be estimated, and a more responsive control algorithm can be implemented in the zoning system to coordinate temperature calls per zone. Such coordination eliminates large room temperature swings and most efficiently cycles the heating/cooling equipment.

Also, this invention corrects for misapplications of a thermostat when it is installed. By merely using the on/off signal provided by the thermostat, the heating/cooling equipment can be properly controlled regardless of variations in the anticipation heat or other characteristics of the thermostat. The present invention can also be implemented in systems with a microelectronic thermostat. This allows the cycle rate of the microelectronic thermostat to be corrected, if it were chosen improperly by a homeowner or installer.

Although the present invention has been described with reference to preferred embodiments, workers skilled in the art will recognize that changes may be made in form and detail without departing from the spirit and scope of the invention.

What is claimed is:

1. An apparatus for controlling a temperature control system having a thermostat with a thermostat switch and which provides an on/off signal, the on/off signal having an on period and an off period and being indicative of a temperature error (e) in a controlled environment, the temperature control system being suitable for controlling temperature control equipment, the apparatus comprising:
   means for sensing the on/off signal of the thermostat;
   means for determining an estimated temperature error (error) based on the on/off signal of the thermostat; and
   a controller for controlling the temperature control equipment based on the estimated temperature error (error) determined from the on/off signal of the thermostat,
wherein the temperature control system includes a proportional-plus-integral (PI) thermostat having a controller with controller memory, and wherein the means for determining the estimated temperature error (error) comprises:
   means for determining an estimated composite temperature error (error') including a proportional error portion and an integral portion; and
   means for determining the estimated temperature error (error) based on the estimated composite error (error') determined.

2. A method of controlling a temperature control system having a thermostat which provides an on/off signal, the on/off signal having an on period and an off period and being indicative of a temperature error (e) in a controlled environment, the temperature control system suitable for controlling temperature control equipment, the method comprising:
   sensing the on/off signal;
   determining an estimated temperature error (error) based on the on/off signal of the thermostat, said determination comprising the steps of determining an anticipator temperature ($T_{ant}$) for the thermostat, determining an adjusted error ($\epsilon$) for the thermostat, and determining the temperature error according to an error equation, comprising $$error = \epsilon - T_{ant}; \text{ and}$$

controlling the temperature control equipment based on the estimated temperature error (error) determined.

3. The method of claim 2 wherein the step of determining the anticipator temperature comprises:
   determining an anticipator time constant ($\tau_a$) for the thermostat;
   determining a heat of anticipation value ($\theta$) for the thermostat; and
   determining the anticipator temperature according to a transfer function with a derivative operator S, the transfer function comprising:

$$\frac{\theta}{\tau_a S + 1}.$$

4. The method of claim 3, wherein the step of determining a heat of anticipation value ($\theta$) for the thermostat comprises:
   determining a new heat of anticipation value ($\theta$) value based on the on period and the off period of the on/off signal; and
   updating a previous heat of anticipation value ($\theta$) with the new heat of anticipation value ($\theta$).

5. The method of claim 3 wherein the control system includes a controller with a controller memory, and wherein the step of determining an anticipator time constant comprises:
retrieving a known anticipator time constant from the controller memory.

6. The method of claim 5 wherein the step of determining a heat of anticipation value comprises:
retrieving a known heat of anticipation value ($\theta$) from the controller memory.

7. The method of claim 2 wherein the step of determining an adjusted error (e) comprises:
determining a first adjusted error endpoint corresponding to the start of the on period;
determining a second adjusted error endpoint corresponding to the start of the off period; and
approximately the adjusted error (e) between the first and second endpoint based on the length of the on period and the off period.

8. A method of controlling a temperature control system having a thermostat which provides an on/off signal, the on/off signal having an on period and an off period and being indicative of a temperature error (e) in a controlled environment, and the temperature control system includes a proportional-plus-integral (PI) thermostat having a controller with controller memory, the temperature control system suitable for controlling temperature control equipment, the method comprising:
sensing the on/off signal;
determining an estimated temperature error (error) based on the on/off signal of the thermostat, and
controlling the temperature control equipment based on the estimated temperature error (error) determined,
wherein the step of determining the estimated temperature error (error) comprises:
determining an estimated composite temperature error (error') including a proportional error portion and an integral error portion; and
determining the estimated temperature error (error) based on the estimated composite temperature error (error) determined.

9. The method of claim 8 wherein the step of determining the estimated composite temperature error (error') comprises:
determining an anticipation temperature ($T_{ant}$) for the thermostat;
determining an adjusted error ($\epsilon$) for the thermostat; and
determining the estimated composite temperature error (error') according to a composite error equation, comprising:

$$error' = \epsilon - T_{ant}.$$

10. The method of claim 8 wherein the PI thermostat has a proportional gain (kp) and an integral gain (ki), and wherein an integrated error (eint) was determined over a previous integration time step where the integration time step size is represented by dt, and wherein the step of determining the estimated temperature error (error) based on the estimated composite temperature error (error) comprises:
determining the estimated temperature error (error) by an error equation, comprising:

$$error = (error' - eint)/(kp + ki \times dt).$$

11. The method of claim 10 and further comprising: updating eint with a new value for eint (eintn) by an equation, comprising:

$$eintn = eint + ki \cdot error \cdot dt.$$

12. A method of controlling a temperature control system having a thermostat which provides an on/off signal, the on/off signal having an on period and an off period and being indicative of a temperature error (e) in a controlled environment, the temperature control system suitable for controlling temperature control equipment, the method comprising:
sensing the on/off signal;
determining an estimated temperature error (error) based on the on/off signal of the thermostat; and
controlling the temperature control equipment based on the estimated temperature error (error) determined, including,
generating an equipment control signal based on the estimated temperature error (error) determined; and
providing the equipment control signal to the temperature control equipment to control cycling of the temperature control equipment.

13. An apparatus for controlling a temperature control system having a thermostat with a thermostat switch and which provides an on/off signal, the on/off signal having an on period and an off period and being indicative of a temperature error (e) in a controlled environment, the temperature control system being suitable for controlling temperature control equipment, the apparatus comprising:
means for sensing the on/off signal of the thermostat;
means for determining an estimated temperature error (error) based on the on/off signal of the thermostat; and
a controller for controlling the temperature control equipment based on the estimated temperature error (error) determined from the on/off signal of the thermostat, wherein the controller comprises:
means for generating a temperature control signal based on the estimated temperature error (error), and for providing the temperature control signal to the temperature control equipment to control cycling of the temperature control equipment.

14. The apparatus of claim 13 wherein the controller comprises:
means for generating a temperature control signal, based on the estimated temperature error (error), and for providing the temperature control signal to the temperature control equipment to control cycling of the temperature control equipment.

15. An apparatus for controlling a temperature control system having a thermostat with a thermostat switch and which provides an on/off signal, the on/off signal having an on period and an off period and being indicative of a temperature error (e) in a controlled environment, the temperature control system being suitable for controlling temperature control equipment, the apparatus comprising:
means for sensing the on/off signal of the thermostat;
means for determining an estimated temperature error (error) based on the on/off signal of the thermostat; and
a controller for controlling the temperature control equipment based on the estimated temperature error (error) determined from the on/off signal of the thermostat, wherein the means for determining the estimated temperature error (error) comprises:

means for determining total droop (droop) for the thermostat;

means for determining duty-cycle for the thermostat based on the on period and off period of the on/off signal; and means for determining the estimated temperature error (error) according to an error equation, comprising:

$$\text{error} = \text{droop} \times \text{duty-cycle}.$$

16. The apparatus of claim 15 wherein the means for determining the total droop (droop) comprises:

means for determining a heat of anticipation ($\theta$) for the thermostat;

means for determining a switching differentail ($\delta$) for the switch in the thermostat; and means for determining the total droop (droop) according to a droop equation, comprising:

$$\text{droop} = \theta - \delta.$$

17. The apparatus of claim 16 wherein the means for determining a heat of anticipation ($\theta$) comprises:

means for determining a simulated switching differential ($\delta_s$); and means for updating the heat of anticipation $\theta$ based on a previous heat of anticipation value ($\theta_{prev}$) according to a relationship comprising:

$$\theta = \theta_{prev} + (\delta - \delta_s).$$

* * * * *

UNITED STATES PATENT AND TRADEMARK OFFICE
CERTIFICATE OF CORRECTION

PATENT NO. : 5,115,968
DATED : May 26, 1992
INVENTOR(S) : ERIC W. GRALD

It is certified that error appears in the above-identified patent and that said Letters Patent is hereby corrected as shown below:

Column 14, line 40, cancel "S minus", and substitute "$\Theta_s$ minus $\delta$".

Column 17, line 6, after "value", insert --($\Theta$)--;

line 10, cancel "(e)" and substitute --($\epsilon$)--;

line 15, cancel "approximately" and substitute approximating";

line 15, cancel "(e)" and substitute --($\epsilon$)--;

line 16, cancel "endpoint" and substitute "endpoints".

Signed and Sealed this

Thirty-first Day of August, 1993

Attest:

BRUCE LEHMAN

*Attesting Officer*     *Commissioner of Patents and Trademarks*